(12) United States Patent
Ueki et al.

(10) Patent No.: US 11,699,056 B2
(45) Date of Patent: Jul. 11, 2023

(54) RFID INLAY

(71) Applicant: Murata Manufacturing Co., Ltd., Nagaokakyo (JP)

(72) Inventors: Noriyuki Ueki, Nagaokakyo (JP); Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 72 days.

(21) Appl. No.: 17/096,327

(22) Filed: Nov. 12, 2020

(65) Prior Publication Data
US 2021/0089851 A1 Mar. 25, 2021

Related U.S. Application Data

(63) Continuation of application No. PCT/JP2020/013281, filed on Mar. 25, 2020.

(30) Foreign Application Priority Data

Sep. 24, 2019 (JP) .................................. 2019-172969

(51) Int. Cl.
*G06K 19/07* (2006.01)
*G06K 19/077* (2006.01)

(52) U.S. Cl.
CPC ....... *G06K 19/071* (2013.01); *G06K 19/0726* (2013.01); *G06K 19/07786* (2013.01)

(58) Field of Classification Search
CPC ............. G06K 19/071; G06K 19/0726; G06K 19/07786
See application file for complete search history.

(56) References Cited

U.S. PATENT DOCUMENTS

| | | | | |
|---|---|---|---|---|
| 5,461,385 A | * | 10/1995 | Armstrong | G08C 17/02 340/447 |
| 8,558,660 B2 | * | 10/2013 | Nix | H04Q 9/00 340/5.1 |
| 8,838,027 B2 | * | 9/2014 | Waters | H04B 5/00 455/418 |
| 10,200,092 B1 | | 2/2019 | Irci et al. | |

(Continued)

FOREIGN PATENT DOCUMENTS

| | | |
|---|---|---|
| CN | 102318215 A | 1/2012 |
| CN | 106033975 A | 10/2016 |

(Continued)

OTHER PUBLICATIONS

Written Opinion of the International Searching Authority issued for PCT/JP2020/013281, dated Jun. 23, 2020.

(Continued)

*Primary Examiner* — Curtis J King
(74) *Attorney, Agent, or Firm* — ArentFox Schiff LLP

(57) ABSTRACT

An RFID inlay includes an RFID module and an antenna. The RFID module includes an RFIC and an antenna sharing circuit provided between the RFIC and the antenna. The RFIC includes a power receiving terminal to which power induced upon receipt of an electromagnetic wave for power reception is input and a transmitting terminal from which a transmission signal for RFID is output. Moreover, the antenna receives the electromagnetic wave for power reception and generates an electromagnetic wave for RFID.

22 Claims, 12 Drawing Sheets

(56) References Cited

U.S. PATENT DOCUMENTS

| | | | |
|---|---|---|---|
| 2004/0113790 A1* | 6/2004 | Hamel | G06K 7/10336 340/572.1 |
| 2005/0003855 A1* | 1/2005 | Wada | H04B 1/005 455/168.1 |
| 2006/0244592 A1* | 11/2006 | Kansala | G06K 19/07703 340/572.1 |
| 2007/0030124 A1* | 2/2007 | Lee | H04B 1/006 340/572.1 |
| 2007/0120679 A1* | 5/2007 | Shin | G06K 7/0008 455/344 |
| 2007/0141997 A1* | 6/2007 | Wulff | G06K 19/0723 340/572.1 |
| 2007/0194929 A1* | 8/2007 | Wagner | H01Q 21/24 340/572.7 |
| 2007/0194931 A1 | 8/2007 | Miller et al. | |
| 2007/0200682 A1* | 8/2007 | Colby | G08B 13/2405 340/10.41 |
| 2007/0200684 A1* | 8/2007 | Colby | G06K 19/072 340/10.51 |
| 2007/0216519 A1* | 9/2007 | Yokoo | H04B 1/406 340/10.1 |
| 2007/0222540 A1* | 9/2007 | Nishigaki | H03H 9/0571 333/133 |
| 2007/0279229 A1* | 12/2007 | Shaffer | G06K 17/0022 340/572.1 |
| 2008/0146148 A1* | 6/2008 | Hulvey | H04W 52/287 455/39 |
| 2008/0174437 A1* | 7/2008 | Arguin | G08B 13/2448 340/10.3 |
| 2009/0052358 A1* | 2/2009 | Uejima | H04B 1/0057 370/297 |
| 2009/0201155 A1* | 8/2009 | Arguin | G08B 13/242 340/572.1 |
| 2009/0219158 A1* | 9/2009 | Nikitin | H01Q 1/2225 340/572.7 |
| 2010/0123561 A1* | 5/2010 | Nam | G06K 7/0008 340/10.5 |
| 2010/0123583 A1* | 5/2010 | Bommer | G06K 19/0723 340/572.7 |
| 2010/0222010 A1 | 9/2010 | Ozaki et al. | |
| 2012/0161941 A1* | 6/2012 | Park | G06K 19/07345 340/10.5 |
| 2013/0234836 A1* | 9/2013 | Davis | G06K 19/0716 340/10.5 |
| 2014/0152253 A1 | 6/2014 | Ozaki et al. | |
| 2015/0126120 A1* | 5/2015 | Chen | H04B 1/0057 455/41.2 |
| 2015/0303983 A1* | 10/2015 | Lee | H04B 1/525 455/83 |
| 2016/0349361 A1* | 12/2016 | Schulte | G01S 13/79 |
| 2017/0288736 A1* | 10/2017 | Zhou | H01Q 1/248 |
| 2020/0380329 A1* | 12/2020 | Lin | H01Q 5/335 |

FOREIGN PATENT DOCUMENTS

| | | | | |
|---|---|---|---|---|
| CN | 110070165 A | | 7/2019 | |
| JP | 09-098046 | * | 8/1997 | H03H 7/46 |
| JP | 2009182446 A | | 8/2009 | |
| JP | 2014039236 A | | 2/2014 | |
| JP | 2019009581 A | | 1/2019 | |
| JP | 2019068412 A | | 4/2019 | |

OTHER PUBLICATIONS

Roberti, Mark; "Wiliot Unveils Passive Bluetooth Sensor"; [online], [Search on Sep. 11, 2019], Internet <URL https://www.rfidjournal.com/articles/view?18235>.

Chinese Office Action issued for Chinese Application No. 202080003102.2, dated Sep. 3, 2021.

Japanese Office Action issued for Japanese Application No. 2020-551600, date of Office Action dated Jan. 12, 2021.

International Search Report issued for PCT/JP2020/013281, dated Jun. 23, 2020.

* cited by examiner ns and an RFIC becomes large in size as a whole, which # RFID INLAY

CROSS REFERENCE TO RELATED APPLICATION

The present application is a continuation of PCT/JP2020/013281 filed Mar. 25, 2020, which claims priority to Japanese Patent Application No. 2019-172969, filed Sep. 24, 2019, the entire contents of each of which are incorporated herein by reference.

TECHNICAL FIELD

The present invention relates to an RFID inlay that is used as an RFID tag and communicates with a reader and writer in a noncontact manner, for example.

BACKGROUND

A passive Bluetooth® sensor is described in a non-patent document "Wiliot Unveils Passive Bluetooth® Sensor" by Mark Roberti, [online], [Search on Sep. 11, 2019], retrieved from the Internet: <URL: www.rfidjournal.com/articles/view?18235>. The document describes that this device detects temperature, pressure, and motion by using RF power such as a radio wave of a wireless LAN or a radio wave of a mobile phone and transmits the information using Bluetooth®. The device carries out communications by the following method rather than a method in which a reflection signal is returned to a reader, as performed by a passive UHF RFID transponder. First, the device receives the radio wave as energy, not as a signal to conduct charging, transmits a part of a message upon being charged with sufficient energy, and waits for being further charged with energy. Then, the device transmits the next part of the message. That is, while receiving energy from surrounding radio waves, the device divides the message and sequentially transmits the message thus divided.

Since the device described in the above-described needs to include two antennas that receive surrounding radio waves and an antenna that transmits a signal using Bluetooth®, an RFID inlay including such a plurality of antennas and an RFIC becomes large in size as a whole, which may restrict an application range of the device. Further, when a power receiving antenna and a signal transmitting antenna are arranged close to each other to reduce size as a whole, unwanted coupling occurs between the antennas, and energy of a radio wave to be transmitted is absorbed by the power receiving antenna, which prevents necessary transmission signal intensity from being obtained.

SUMMARY OF THE INVENTION

It is therefore an object of the present invention to provide an RFID inlay that includes an antenna configured or serving as both a power receiving antenna and a transmitting antenna to avoid unwanted coupling between antennas and allows downsizing as a whole.

Accordingly, an RFID inlay is provided that includes an RFIC having a power receiving terminal to which power induced upon receipt of an electromagnetic wave for power reception is input and a transmitting terminal from which a transmission signal for RFID is output. Moreover, an antenna is provided that receives the electromagnetic wave for the power reception and generates an electromagnetic wave for the RFID, and an antenna sharing circuit is provided between the antenna, and the power receiving terminal and the transmitting terminal.

According to the exemplary embodiments of the present invention, an RFID inlay is provided that includes the antenna configured or serving as both a power receiving antenna and a transmitting antenna, avoids unwanted coupling between antennas, and allows a reduction in overall size compared with existing devices.

DETAILED DESCRIPTION

Figure 1:
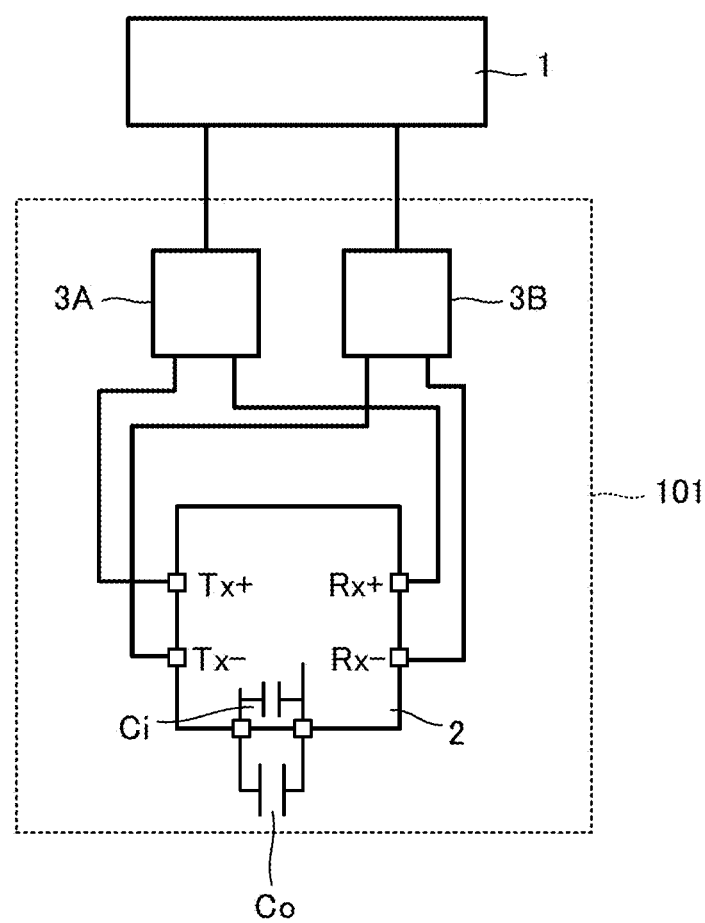
FIG. 1 is a diagram showing a circuit structure of an RFID inlay 201 according to a first exemplary embodiment.

Hereinafter, a plurality of exemplary embodiments for carrying out the present invention will be described with reference to the drawings and some specific examples. In the drawings, the same parts are denoted by the same reference numerals. Although the embodiments will be described separately, for the sake of convenience, in consideration of easy explanation or understanding of the gist, some components can be replaced or combined in different embodiments. It is noted that in second and subsequent embodiments, no description will be given of points common to a first embodiment, and only differences will be described. In particular, no description will be given of the same actions and effects of the same configuration one by one for each embodiment.

First Exemplary Embodiment

FIG. 1 is a diagram showing a circuit structure of an RFID ("radio-frequency identification") inlay 201 according to the first exemplary embodiment. The RFID inlay 201 includes an RFID module 101 and an antenna 1 connected to the RFID module 101. The RFID module 101 includes an RFIC ("radio-frequency integrated circuit") 2 and antenna sharing circuits 3A, 3B connected between the RFIC 2 and the antenna 1.

The RFIC 2 includes power receiving terminals Rx+, Rx− to which power induced upon receipt of an electromagnetic wave for power reception is input, and transmitting terminals Tx+, Tx− from which a transmission signal for RFID is output. The power receiving terminal Rx+ and the transmitting terminal Tx+ are connected to the antenna sharing circuit 3A, and the power receiving terminal Rx− and the transmitting terminal Tx− are connected to the antenna sharing circuit 3B.

In operation, the antenna 1 receives the electromagnetic wave for power reception and generates (e.g., transmits) an electromagnetic wave of an RFID signal. The antenna sharing circuits 3A, 3B are circuits that allow the antenna 1 to be used as both a power receiving antenna and a signal transmitting antenna.

Moreover, in an exemplary aspect, the antenna 1 receives a radio wave in a low band (700 MHz to 1 GHz) of Long Term Evolution (LTE) or a radio wave in a 2.4 GHz band or 5 GHz band transmitted from an access point of a wireless LAN, for example. Further, the antenna 1 transmits a radio wave in a 2.4 GHz band of the Bluetooth® Low Energy (BLE) standard of Bluetooth®, for example.

The RFIC 2 is the same as, for example, the RFIC described in the above-described non-patent document, and the RFIC 2 receives the radio wave used as energy, charges an internal capacitor Ci, and transmits, upon being charged with sufficient energy, a predetermined message based on this energy, under the above-described BLE standard. When the whole of the message cannot be transmitted by one transmission, the RFIC 2 can be configured to transmit the message sequentially in a time division manner while receiving energy from surrounding radio waves until the transmission of the whole of the predetermined message is completed.

The example shown in FIG. 1 includes an external capacitor Co that is connected in parallel to the internal capacitor Ci of the RFIC 2. This structure can make combined capacitance of the capacitors Ci, Co larger, which makes a transmission distance longer or makes a message capacity for one transmission larger. Further, selecting the capacitance of the external capacitor Co as needed allows optimization of a rate of increase in charging voltage induced by power reception. In other words, a time constant for charging the combined capacitance is proportional to the combined capacitance, and thus an increase in message capacity for one transmission and a required charging time have a trade-off relation, which allows selection of combined capacitance suited to a power receiving condition.

Figure 2:
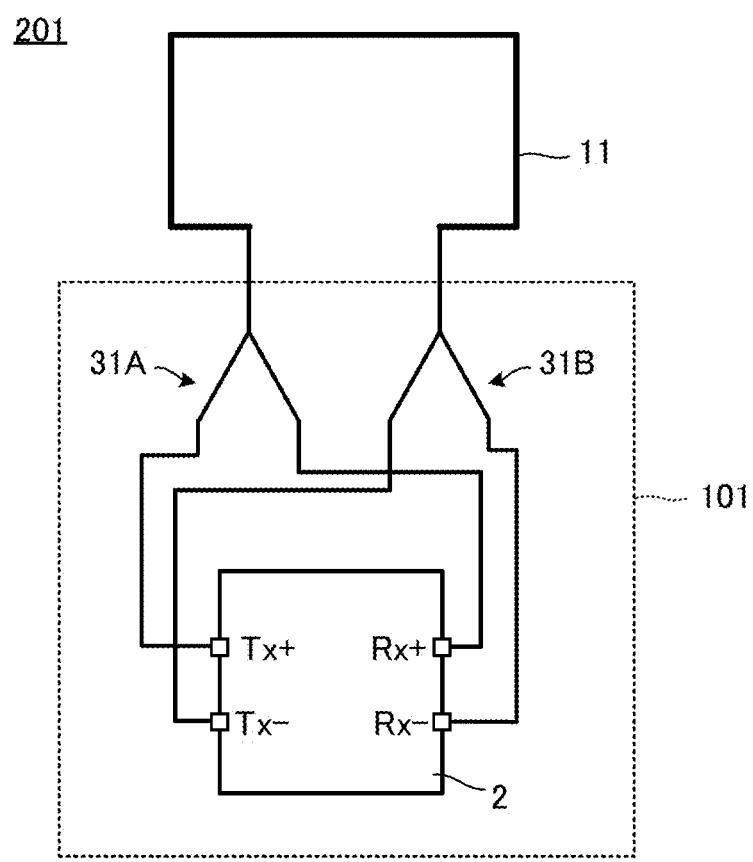
FIG. 2 is a diagram detailing the circuit structure of the RFID inlay 201 according to the first exemplary embodiment.

FIG. 2 is a diagram detailing a circuit structure of the RFID inlay 201 according to the first embodiment. In this example, the antenna sharing circuits 3A, 3B shown in FIG. 1 are made up of directional couplers 31A, 31B, respectively. Further, the antenna 1 is made up of a loop antenna 11.

The directional couplers 31A, 31B guide power induced in the antenna 11 to the power receiving terminals Rx+, Rx− of the RFIC 2 and guide the transmission signal output from the transmitting terminals Tx+, Tx− of the RFIC 2 to the antenna 11. Further, the directional couplers 31A, 31B prevent the transmission signal from leaking to the power receiving terminals Rx+, Rx− (flowing into the Rx+, Rx− terminals).

Figure 3:
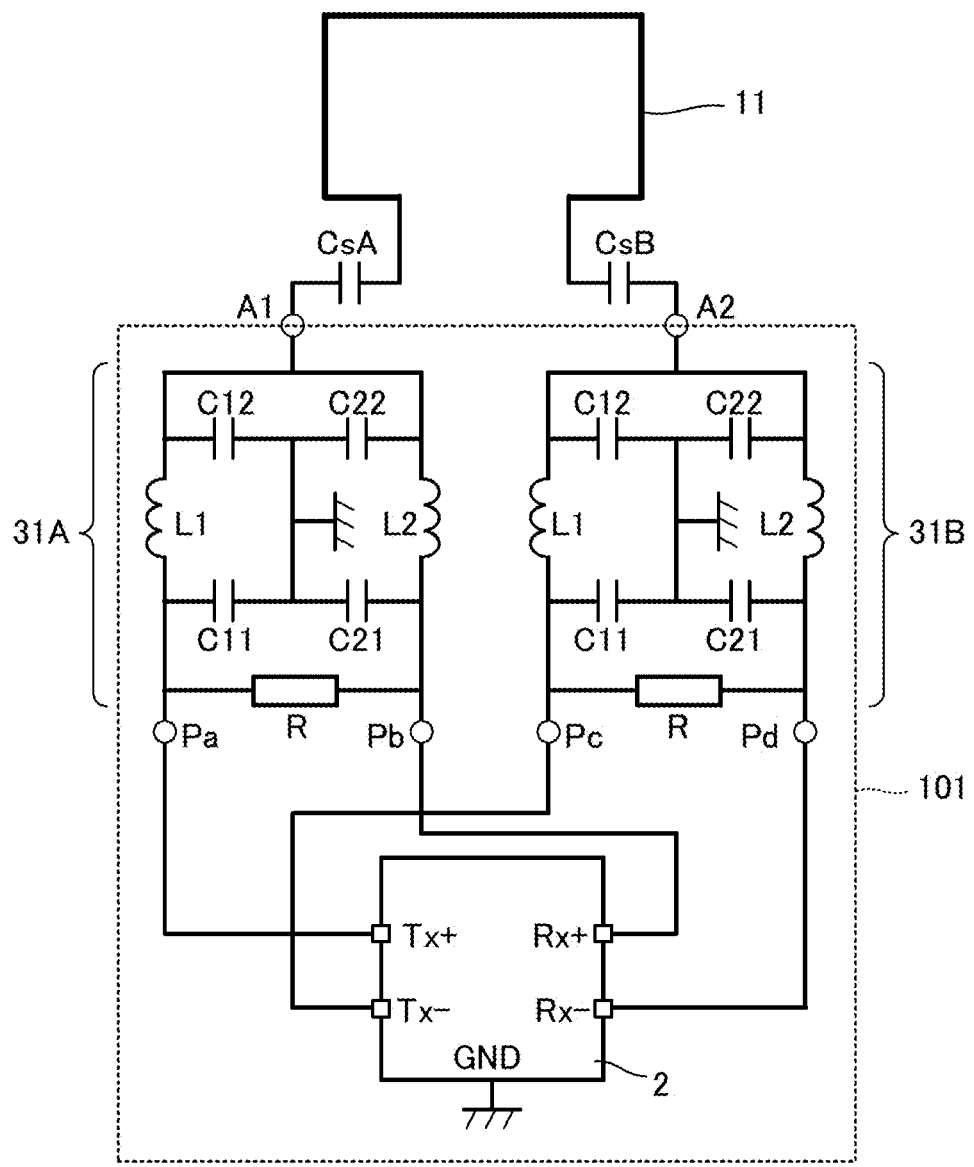
FIG. 3 is a diagram detailing circuit structures of directional couplers 31A, 31B shown in FIG. 2.

FIG. 3 is a diagram detailing circuit structures of the directional couplers 31A, 31B shown in FIG. 2. In this example, each of the directional couplers 31A, 31B includes coils L1, L2, capacitors C11, C12, C21, C22, and a resistor R, and serves as a 3 dB duplexer. The coil L1 and the coil L2 are magnetically coupled. FIG. 3 shows connection parts (or nodes) Pa, Pb, Pc, Pd, with respect to the RFIC 2, of the directional couplers 31A, 31B. These connection parts will be referred to in the following embodiments.

In FIG. 3, grounds of the directional couplers 31A, 31B are connected to a ground of the RFIC 2. However, when the RFIC 2 has no ground terminal or when the ground of the RFIC 2 is not connected to the RFIC 2, the symbol of the grounds of the directional couplers 31A, 31B represents the reference potential (e.g., neutral potential), and the reference potentials may be electrically connected to each other for stable operation.

It is noted that, in the example shown in FIG. 3, power feeding terminals of the antenna 11 are connected to antenna connection parts A1, A2 of the RFID module 101 via capacitors CsA, CsB. The capacitors CsA, CsB correspond to stray capacitance generated between a conductor pattern of the antenna 11 formed on a sheet and electrodes of the RFID module 101 mounted on the sheet. Specific examples of the structures of the antenna and the RFID module will be described in the following embodiment.

According to the present embodiment, since the single antenna 1, 11 is used for both power reception and transmission, unwanted coupling between antennas can be avoided. Further, this configuration eliminates the need of arranging a power receiving antenna and a transmitting antenna so as to avoid interference between the power receiving antenna and the transmitting antenna, and it is thus possible to obtain an RFID inlay that is downsized as a whole.

Second Exemplary Embodiment

A description of the second embodiment will focus on an RFID inlay including an antenna sharing circuit different in structure from the example shown in the first embodiment.

Figure 4:
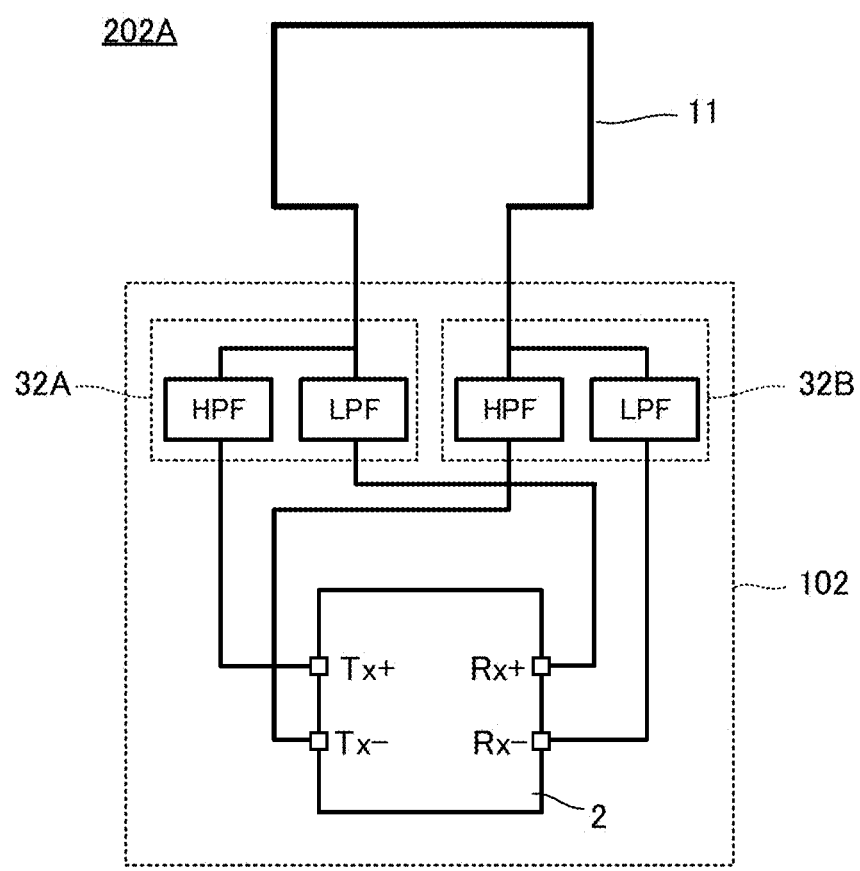
FIG. 4 is a diagram showing a circuit structure of an RFID inlay 202A according to a second exemplary embodiment.

FIG. 4 is a diagram showing a circuit structure of an RFID inlay 202A according to the second embodiment. The RFID inlay 202A includes an RFID module 102 and the antenna 11 connected to the RFID module 102. The RFID module 102 includes the RFIC 2 and duplexers 32A, 32B connected between the RFIC 2 and the antenna 11. The duplexers 32A, 32B are examples of the antenna sharing circuit according to the present disclosure. It is also noted that directional couplers may be used instead of the duplexers 32A, 32B. For example, a broadside coupler made up of stripline may be used as a distributed-constant directional coupler.

The power receiving terminal Rx+ and the transmitting terminal Tx+ of the RFIC 2 are connected to the duplexer 32A, and the power receiving terminal Rx− and the transmitting terminal Tx− are connected to the duplexer 32B.

According to the present embodiment, high-pass filters HPF of the duplexers 32A, 32B each output a transmission signal in the 2.4 GHz band to the antenna 11. Further, low-pass filters LPF of the duplexers 32A, 32B output, to the power receiving terminals Rx+, Rx− of the RFIC 2, a received signal (e.g., received power) in a frequency band lower than the 2.4 GHz band, such as the LTE low band (700 MHz to 1 GHz).

Figure 5:
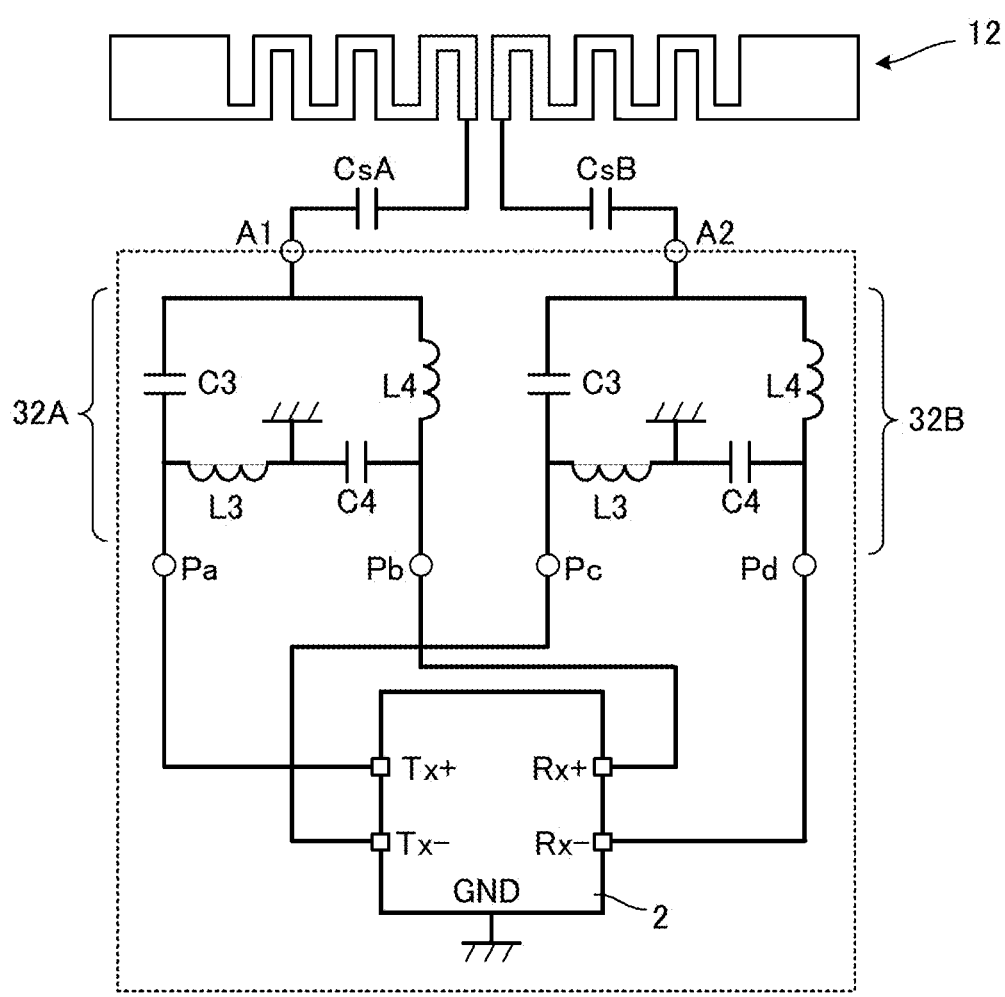
FIG. 5 is a diagram showing a circuit structure of another RFID inlay 202B according to the second exemplary embodiment.

FIG. 5 is a diagram showing a circuit structure of another RFID inlay 202B according to the second embodiment. In FIG. 5, the duplexers 32A, 32B are represented by a detailed circuit diagram. In the duplexers 32A, 32B, a capacitor C3 and an inductor L3 make up the high-pass filter, and a capacitor C4 and an inductor L4 make up the low-pass filter. The high-pass filter is constructed to pass, for example, a frequency of 2.45 GHz, and the low-pass filter passes a signal in, for example, the LTE low band (700 MHz to 1 GHz).

In the example shown in FIG. 5, the RFID inlay 202B includes a dipole antenna 12. Moreover, in an exemplary aspect, the antenna 12 resonates in the 900 MHz band and in the 2.4 GHz band. The antenna 12 is made up of a meander line-shaped conductor pattern formed on an insulation sheet. A radiating element made up of such a meander line-shaped conductor pattern makes an area where the conductor pattern is formed on the insulation sheet shorter. Further, open ends that are ends of the conductor pattern have a shape extending wider in a plane direction than other parts, and a capacitance component is generated between the open ends and the ground. This configuration also shortens a line length of the meander line-shaped conductor pattern required to achieve a predetermined resonance frequency.

In the example shown in FIG. 5, in order to consider the transmission signal to be in a high band and to receive power in a low band, the high-pass filter passes the transmission signal, and the low-pass filter passes the received power, but the exemplary embodiments are not limited to this configuration. For example, when the RFIC 2 includes two sets of power receiving terminals Rx+, Rx−, a triplexer circuit that conducts separation into three frequency bands of low band, middle band, and high band may be provided. That is, the low band filter may pass the transmission signal, the middle band filter may pass a low frequency side of the received power, and the high band filter may pass a high frequency side of the received power.

Third Exemplary Embodiment

A description of the third embodiment will focus on an RFID inlay that allows a path of the transmission signal to be selectively connected to the antenna.

Figure 6:
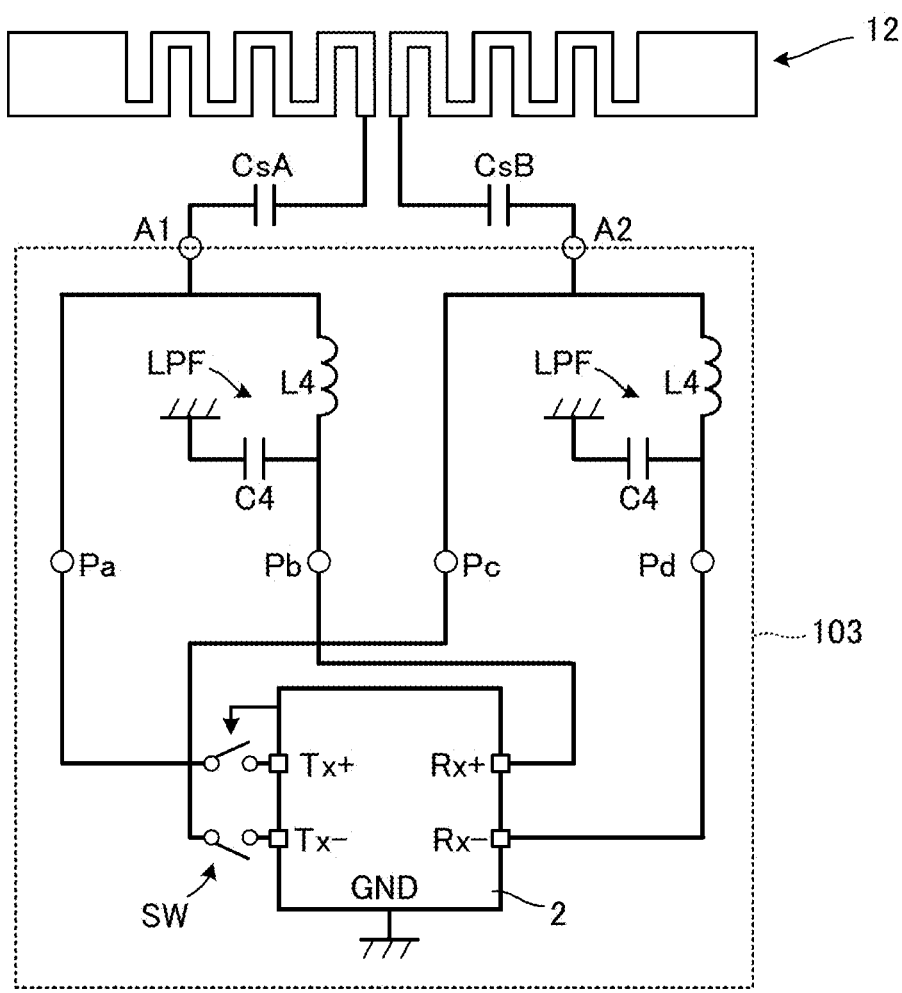
FIG. 6 is a diagram showing a circuit structure of an RFID inlay 203 according to a third exemplary embodiment.

FIG. 6 is a diagram showing a circuit structure of an RFID inlay 203 according to the third embodiment. The RFID inlay 203 includes an RFID module 103 and the antenna 12 connected to the RFID module 103. In the example shown in FIG. 6, low-pass filters LPF each made up of a capacitor C4 and an inductor L4 are provided between the power receiving terminal Rx+, Rx− of the RFIC 2 and the antenna 12. In this configuration, these low-pass filters LPF output, to the power receiving terminals Rx+, Rx− of the RFIC 2, a received signal (e.g., received power) in, for example, the LTE low band (700 MHz to 1 GHz) received by the antenna 12. Further, the low-pass filters LPF block a signal in the 2.4 GHz band that is the transmission signal output from the transmitting terminals Tx+, Tx− and prevent the transmission signal from leaking to the power receiving terminals Rx+, Rx−.

Moreover, the RFID inlay 203 according to the present embodiment includes a switch SW provided between the RFIC 2 and the antenna 12. The switch SW is controlled in accordance with a signal that is output from the RFIC 2 and that indicates output timing of the transmission signal, or in accordance with the presence or absence of the transmission signal.

When turned on, the switch SW connects the transmitting terminals Tx+, Tx− of the RFIC 2 to the antenna 12 via the capacitors CsA, CsB. When turned off, the switch SW disconnects the transmitting terminals Tx+, Tx− of the RFIC 2 from a path extending from the antenna 12 to the power receiving terminals Rx+, Rx− of the RFIC 2.

The structure that allows the path of the transmitting terminal to be selectively connected to the antenna by the switch SW as in the present embodiment allows the switch SW and the low-pass filter LPF to make up an antenna sharing circuit.

Fourth Exemplary Embodiment

Figure 7A:
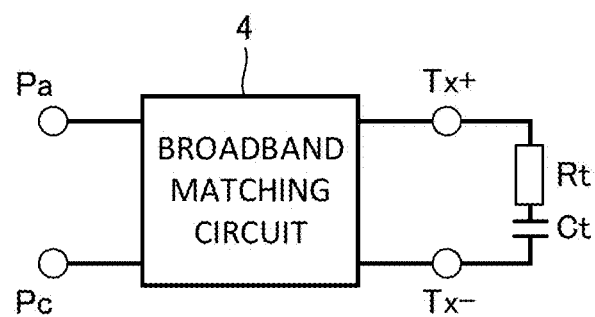
FIG. 7A is a diagram showing a connection relation of a broadband matching circuit 4 between transmitting terminals Tx+, Tx− of an RFIC 2 and an antenna.

A description of the fourth embodiment will focus on an RFID inlay including a broadband matching circuit provided at the transmitting terminals of the RFIC 2. FIG. 7A is a diagram showing a connection relation of a broadband matching circuit 4 between the transmitting terminals Tx+, Tx− of the RFIC 2 and the antenna. Connection parts Pa, Pc shown in FIG. 7A correspond to the connection parts Pa, Pc shown in FIGS. 3, 5, 6, and the like. Further, in FIG. 7A, a circuit including an equivalent resistance Rt and an equivalent capacitor Ct is an equivalent circuit as the inside of the RFIC 2 is viewed from the transmitting terminals Tx+, Tx− of the RFIC 2.

When the RFIC 2 outputs the transmission signal from the transmitting terminals Tx+, Tx−, an impedance between the transmitting terminals Tx+, Tx− changes in accordance with a high level or a low level. That is, values of the equivalent resistance Rt and the equivalent capacitor Ct change in accordance with a "0" and "1" sequence of the transmission signal. As described above, a change in impedance between the transmitting terminals Tx+, Tx− causes characteristics of the antennas 11, 12 and the antenna sharing circuit connected to the transmitting terminals Tx+, Tx− to change.

The broadband matching circuit 4 suppresses, even when the impedance between the transmitting terminals Tx+, Tx− changes, a change in the characteristics of the antennas 11, 12 and the antenna sharing circuit.

Figure 7B:
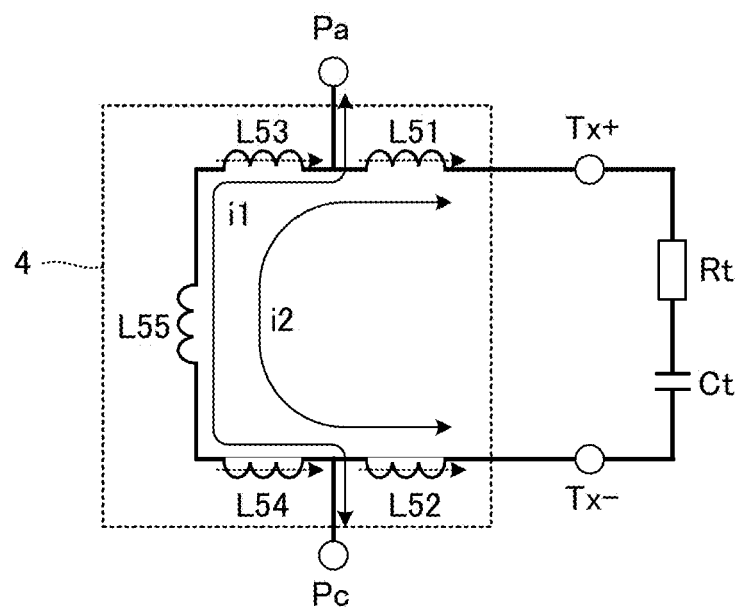
FIG. 7B is a diagram detailing a circuit structure of the broadband matching circuit 4.

FIG. 7B is a diagram detailing a circuit structure of the broadband matching circuit 4. In FIG. 7B, characteristics of impedance matching by the broadband matching circuit 4 are determined by values of inductors L51 to L55.

One end of the inductor L51 is connected to the transmitting terminal Tx+ of the RFIC 2. One end of the inductor L52 is connected to the transmitting terminal Tx− of the RFIC 2. The other end of the inductor L51 is connected to one end of the inductor L53. The other end of the inductor L52 is connected to one end of the inductor L54. The inductor L55 is connected between the other end of the inductor L53 and the other end of the inductor L54. The connection part Pa is connected to a connection point of the inductors L51, L53. The connection portion Pc is connected to a connection point of the inductors L52, L54.

The inductor L51 and the inductor L53 are coupled with a polarity indicated by the dashed arrows in FIG. 7B, and the inductor L52 and the inductor L54 are coupled with a polarity indicated by the dashed arrows in FIG. 7B. Further, the inductors L51, L53 are spiral coils and face each other in a stacking direction. Therefore, the inductors L51, L53 are magnetically and capacitively coupled. Similarly, the inductors L52, L54 are also magnetically and capacitively coupled.

Further, as shown in FIG. 7B, the equivalent capacitor Ct of the RFIC 2 exists between the connection part Pa and the connection part Pc. This causes two resonances to occur in an RFID tag. The first resonance is a resonance that occurs in a circuit connected to the connection parts Pa, Pc, that is, a current path including the inductors L53, L54, L55. The second resonance is a resonance that occurs in a current path (e.g., current loop) including the inductors L51 to L55 and the equivalent capacitor Ct. These two resonances are coupled by the inductors L53, L54, L55 shared by each current path. Two currents i1 and i2 respectively corresponding to the two resonances flow as indicated by the double-ended arrow lines shown in FIG. 7B.

Further, both a frequency of the first resonance and a frequency of the second resonance are affected by the inductors L53 to L55. This causes a difference between the frequency of the first resonance and the frequency of the second resonance. Coupling the two resonances as described above causes the RFID tag including the broadband matching circuit 4 to exhibit broadband resonance frequency characteristics.

Fifth Exemplary Embodiment

A description of the fifth embodiment will focus on an RFID inlay in which an antenna is adapted to a wider band by a circuit.

Figure 8:
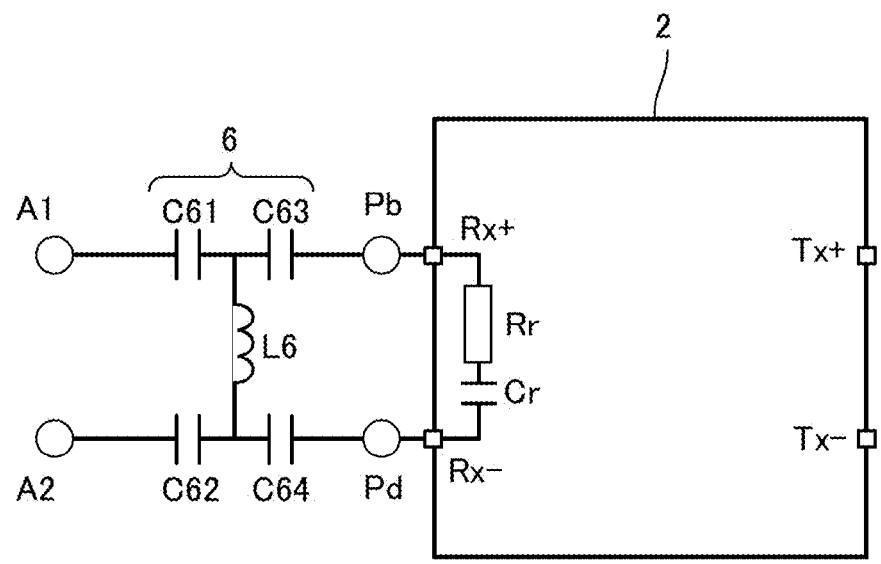
FIG. 8 is a circuit diagram of an antenna band widening circuit 6 in an RFID inlay according to a fifth exemplary embodiment.

FIG. 8 is a circuit diagram of an antenna band widening circuit 6 of the RFID inlay according to the fifth embodiment. The antenna band widening circuit 6 includes an inductor L6 and capacitors C61 to C64 and is provided between the antenna connection parts A1, A2 and connection parts Pb, Pd. In FIG. 8, a circuit including an equivalent resistance Rr and an equivalent capacitor Cr is an equivalent circuit as the inside of the RFIC 2 is viewed from the power receiving terminals Rx+, Rx− of the RFIC 2.

According to the exemplary aspect, the antenna band widening circuit 6 is a high-pass filter circuit, and widens the band by causing another resonance characteristic to occur in the resonance characteristics of the antenna connected to the antenna connection parts A1, A2. In other words, the resonance characteristics of the antenna itself show that a change in impedance of the antenna when the frequency is increased moves in a clockwise direction on the Smith chart; however, the phase is rotated by 90° near a pole part (i.e., a cutoff frequency) of the high-pass filter, and thus a small loop is drawn in a direction opposite to the direction of impedance change of the antenna that is the clockwise direction. Passing jX=0 of the Smith chart during the change of this small loop causes another resonance different from the resonance of the antenna to occur. The use of such a high-pass filter as in this example causes resonance to occur at a frequency lower than the resonance frequency of the antenna.

In an exemplary aspect, the band widening circuit can be comprised of a low-pass filter. In this case, resonance occurs at a frequency higher than the resonance frequency of the antenna. It is also noted that, for both the high-pass filter and the low-pass filter, the resonance frequency to be added and the cutoff frequency of the filter are slightly deviated due to matching characteristics between the antenna and the band widening circuit.

Figure 9A:
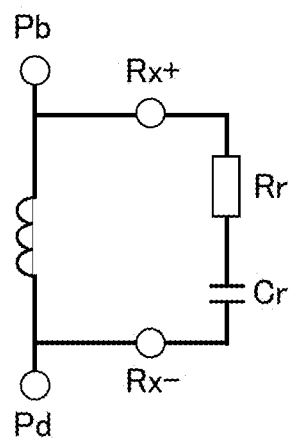
FIGS. 9A and 9B are diagrams showing an example of a matching circuit connected between connection parts Pb, Pd shown in FIG. 8.
Figure 9B:
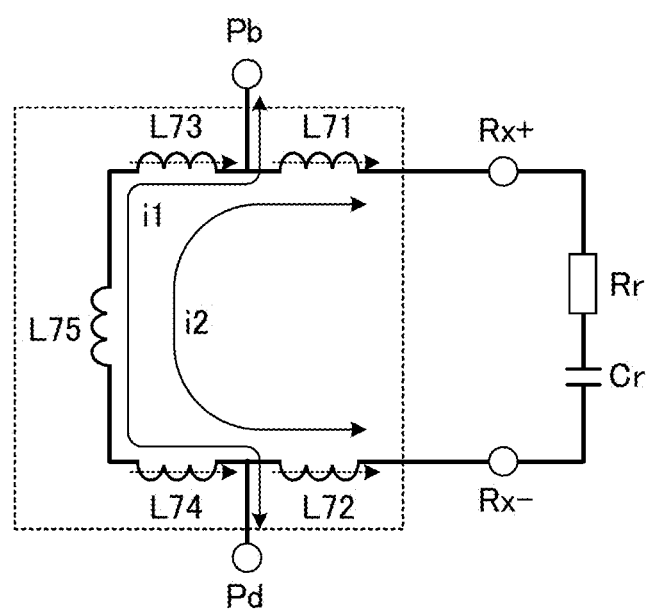

FIGS. 9A and 9B are diagrams showing an example of a matching circuit connected between the connection parts Pb, Pd shown in FIG. 8.

When the impedance between the power receiving terminals Rx+, Rx− of the RFIC 2 is not 50Ω as a reference, in order to make impedance matching between the RFIC 2 and the antenna band widening circuit, as shown in FIG. 9A, an inductor may be connected between the connection parts Pb, Pd (i.e., between the power receiving terminals Rx+, Rx− of the RFIC 2). Further, as shown in FIG. 9B, a matching circuit made up of inductors L71 to L75 may be connected between the power receiving terminals Rx+, Rx− of the RFIC 2 and the connection parts Pb, Pd.

In FIG. 9A, when the equivalent resistance Rr of the RFIC 2 is lower than the impedance of the antenna, forming a parallel resonance circuit including the inductor and the equivalent capacitor Cr of the RFIC 2 increases the impedance to make matching. The use of such parallel resonance makes matching in a relatively narrow band.

In FIG. 9B, the inductor L71 and the inductor L73 are coupled with a polarity indicated by the dashed arrows in FIG. 9B, and the inductor L72 and the inductor L74 are coupled with a polarity indicated by the dashed arrows shown in FIG. 9B. Further, the inductors L71, L73 are spiral coils and face each other in the stacking direction. Therefore, the inductors L71, L73 are magnetically and capacitively coupled. Similarly, the inductors L72, L74 are also magnetically and capacitively coupled.

Further, as shown in FIG. 9B, the equivalent capacitor Cr of the RFIC 2 exists between the connection part Pb and the connection part Pd. This configuration causes two resonances to occur in an RFID tag. The first resonance is a resonance that occurs in a circuit connected to the connection parts Pb, Pd, that is, a current path made up of the inductors L73, L74, L75. The second resonance is a resonance that occurs in a current path (e.g., current loop) formed of the inductors L71 to L75 and the equivalent capacitor Cr. These two resonances are coupled by the inductors L73, L74, L75 shared by each current path. Two currents i1 and i2 respectively corresponding to the two resonances flow as indicated by the double-ended arrow lines shown in FIG. 9B.

Further, both a frequency of the first resonance and a frequency of the second resonance are affected by the inductors L73, L74, L75. This causes a difference between the frequency of the first resonance and the frequency of the second resonance. Accordingly, the two resonances are coupled to widen the band.

Sixth Exemplary Embodiment

A description of the sixth embodiment will focus on an antenna sharing circuit different from the examples described above.

Figure 10:
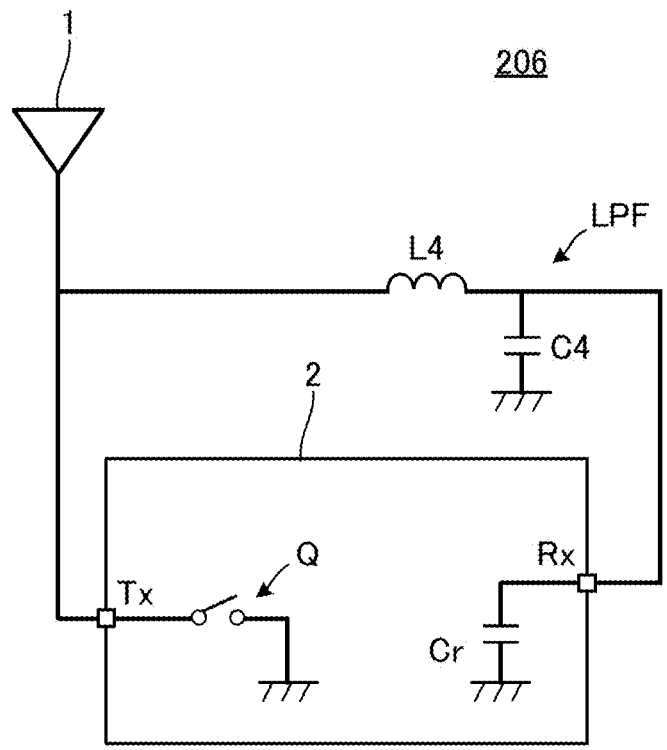
FIG. 10 is a circuit diagram of an RFID inlay 206 according to a sixth exemplary embodiment.

FIG. 10 is a circuit diagram of an RFID inlay 206 according to the sixth embodiment. The RFID inlay 206 includes an RFIC 2, a low-pass filter LPF, and the antenna 1. FIG. 10 shows an internal switch element Q connected to the transmitting terminal Tx of the RFIC 2 and an internal capacitor Cr connected to the power receiving terminal Rx. According to the present embodiment, both the power receiving terminal and the transmitting terminal of the RFIC 2 are unbalanced terminals.

The low-pass filter LPF is made up of a series-connected inductor L4 and a capacitor C4 shunt-connected to the ground. This low-pass filter LPF is connected between the Rx terminal of RFIC 2 and the antenna 1.

It is noted that the low-pass filter LPF is the same in structure as the low-pass filter LPF shown in FIG. 6 according to the third embodiment. That is, this low-pass filter LPF outputs, to the power receiving terminal Rx of the RFIC 2, a received signal (e.g., received power) in, for example, the LTE low band (700 MHz to 1 GHz) received by the antenna 1. Further, the low-pass filter LPF blocks a signal in the 2.4 GHz band that is the transmission signal output from the transmitting terminal Tx and prevents the transmission signal from leaking to the power receiving terminal Rx.

The internal switch element Q connected to the transmitting terminal Tx of the RFIC 2 is turned on/off in accordance with a "0" and "1" sequence of the transmission signal.

Although not shown in FIG. 10, when the switch element Q is turned on, the equivalent capacitor (e.g., Ct shown in FIGS. 7A and 7B) can be seen as viewed from the transmitting terminal Tx. The switch element Q remains off when the transmission signal is not output. When the transmission signal is transmitted with the switch element Q turned on, an LC parallel circuit including the inductor L4 and the capacitors C4 and Cr is connected between the power receiving terminal Rx and the ground. The resonance frequency of this LC parallel circuit is set so as to match or be close to the frequency band of the transmission signal. Therefore, when the switch element Q is turned on, the impedance between the power receiving terminal Rx and the ground is brought into a high impedance state, which prevents the transmission signal from flowing into the power receiving terminal Rx. That is, when viewed from the transmitting terminal Tx, the inductor L4 connected in series of the low-pass filter LPF has high impedance, and the capacitors C4 and Cr shunt-connected to the ground have low impedance, which provides isolation between the transmitting terminal Tx and the power receiving terminal Rx.

Seventh Exemplary Embodiment

A description of the seventh embodiment will focus on an RFID inlay provided with both a power receiving antenna and a transmitting antenna.

Figure 11:
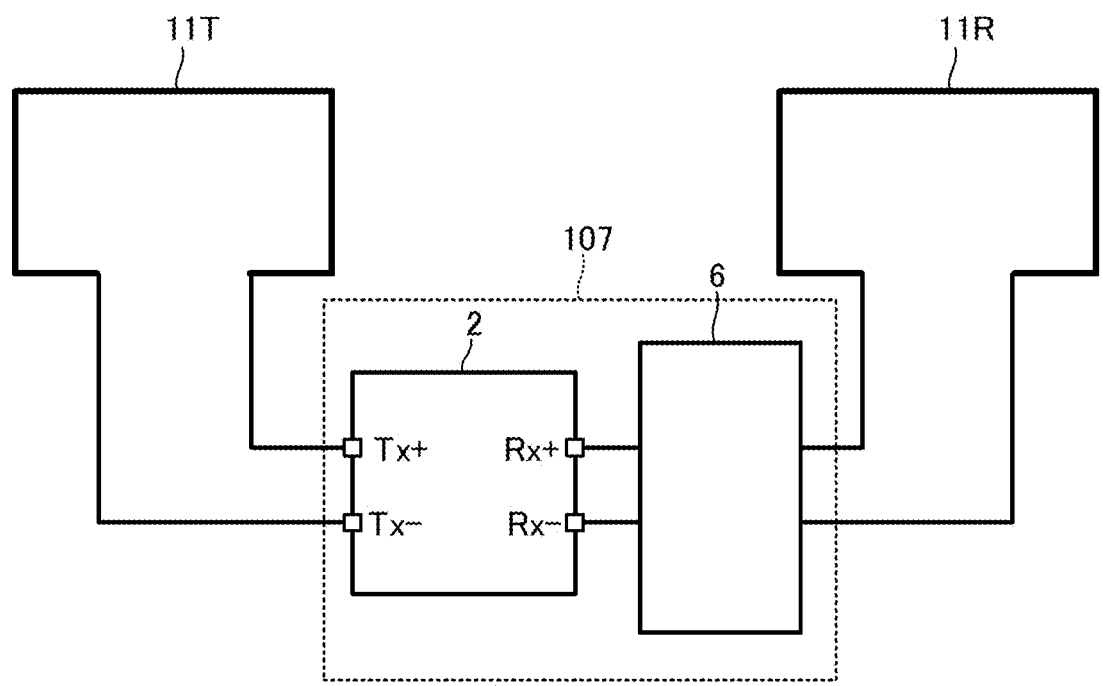
FIG. 11 is a diagram showing a circuit structure of an RFID inlay 207 according to a seventh exemplary embodiment.

FIG. 11 is a diagram showing a circuit structure of an RFID inlay 207 according to the seventh embodiment. The RFID inlay 207 includes an RFID module 107, a power receiving antenna 11R and a transmitting antenna 11T. The RFID module 107 includes an RFIC 2 and an antenna band widening circuit 6. The transmitting antenna 11T is connected to the transmitting terminals Tx+, Tx− of the RFIC 2. Moreover, the power receiving antenna 11R is connected to the power receiving terminals Rx+, Rx− via the antenna band widening circuit 6.

In an exemplary aspect, the antenna band widening circuit 6 is the same in structure as the antenna band widening circuit 6 shown in FIG. 8. Moreover, the power receiving antenna 11R is a loop antenna. The power receiving antenna 11R to which the antenna band widening circuit 6 is connected has a gain over a wide band of 1.7 GHz to 2.5 GHz, for example.

The transmitting antenna 11T is a loop antenna where a high gain can be obtained in the 2.4 GHz band, for example.

In this example, since a radio wave in the 2.4 GHz band of the BLE standard of Bluetooth® is transmitted as the transmission signal, the resonance frequency of the transmitting antenna 11T is set to 2.45 GHz. On the other hand, in the power receiving antenna, in order to use radio waves over a wide band as energy, the resonance frequency band of the power receiving antenna 11R is widened by the antenna band widening circuit 6. This allows the power receiving antenna 11R to receive, as power, radio waves in the LTE 1.7 GHz band to 2.5 GHz band or radio waves in the 2.4 GHz band of wireless LAN.

The power receiving antenna 11R is a general loop antenna but is connected with the antenna band widening circuit 6 to have the ability to receive power over such a wide band.

It is noted that, in the example shown in FIG. 11, both the transmitting antenna 11T and the power receiving antenna 11R are loop antennas, but one or both may be a dipole antenna in alternative aspects. Unwanted coupling between the transmitting antenna 11T and the power receiving antenna 11R causes the transmission signal to be received by the power receiving antenna 11R and causes energy of a radio wave to be transmitted to be absorbed into the side of the power receiving antenna 11R, which prevents necessary transmission signal intensity from being obtained. However, when either of the transmitting antenna 11T and the power receiving antenna 11R is a loop antenna, and the other is a dipole antenna, unwanted coupling can be suppressed even when both the antennas are arranged relatively close to each other, which allows the RFID inlay to be downsized as a whole.

Eighth Exemplary Embodiment

A description of the eighth embodiment will focus on detailed structures of the antenna and the RFID module.

Figure 12:
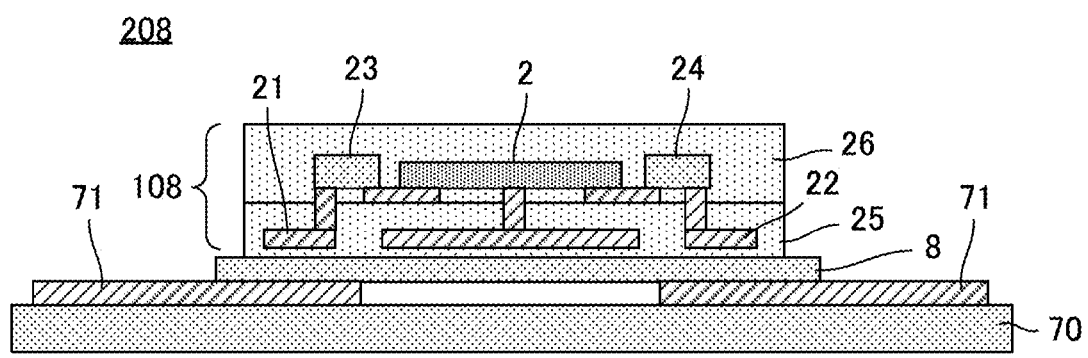
FIG. 12 is a cross-sectional view of an RFID inlay 208 according to an eighth exemplary embodiment.

FIG. 12 is a cross-sectional view of an RFID inlay 208 according to the eighth embodiment. The RFID inlay 208 is provided by bonding an RFID module 108 to a sheet 70 provided with an antenna.

The sheet 70 is, for example, a PET film sheet and is provided with an antenna conductor pattern 71 provided by patterning an aluminum foil. The antenna conductor pattern 71 defines, for example, a loop antenna or a dipole antenna.

The RFID module 108 includes a substrate 25 made of, for example, polyimide. The RFIC 2 and chip components 23, 24 such as a chip capacitor, a chip inductor, and a chip resistor are mounted on the substrate 25. Further, bonded electrodes 21, 22 are provided in the substrate 25. An upper surface of the substrate 25 is covered with a coating material 26 made of an elastomer such as polyurethane.

The RFID module 108 is bonded to the sheet 70 with an adhesive layer 8 interposed between the RFID module 108 and the sheet 70. The adhesive layer 8 is, for example, a layer of an acrylic adhesive and has a thickness of, for example, less than 10 μm. In this state, the bonded electrodes 21, 22 face a predetermined portion of the antenna conductor pattern 71. The RFID module 108 and the antenna conductor pattern 71 are capacitively coupled by stray capacitance generated in the facing portion. This stray capacitance corresponds to the capacitors CsA, CsB shown in FIGS. 3, 5, 6, and the like. Note that the adhesive layer 8 may have conductivity.

Finally, it is noted that the descriptions given of the above embodiments are illustrative only in all respects and are not restrictive. It is possible for those skilled in the art to make variations and modifications as appropriate.

For example, in order to consider the transmission signal to be in a low band and to receive power in a high band, the high-pass filter passes the transmission signal, and the low-pass filter passes the received power, but the exemplary embodiments are not limited to this configuration. When the high and low relationship between the frequency band of the transmission signal and the frequency band of the received power is opposite to the above-described relationship, the low-pass filter may pass the transmission signal, and the high-pass filter may pass the received power.

What is claimed:
1. An RFID inlay comprising:
an RFIC that includes a power receiving terminal that receives power induced upon receipt of an electromagnetic wave for power reception and a transmitting terminal that outputs a transmission signal for RFID;
an antenna configured to receive the electromagnetic wave for the power reception and to generate an electromagnetic wave for the RFID; and an antenna sharing circuit that includes:
   at least one inductor and at least one capacitor and that is disposed between the antenna, the power receiving terminal and the transmitting terminal, and
   a switch configured to connect the transmitting terminal to the antenna when the transmission signal for the RFID is transmitted,
   wherein the switch is disposed between the antenna and the transmitting terminal, and no switch is disposed between the antenna and the power receiving terminal.

2. The RFID inlay according to claim 1, wherein the antenna sharing circuit is a directional coupler including the at least one inductor and the at least one capacitor, with the directional coupler being configured to output the received power induced in the antenna upon receipt of the electromagnetic wave for the power reception to the power receiving terminal.

3. The RFID inlay according to claim 2, wherein the directional coupler is further configured to output the transmission signal from the transmitting terminal to the antenna.

4. The RFID inlay according to claim 1, wherein the antenna sharing circuit includes:
   a first filter that passes a low frequency band of the received power induced in the antenna upon receipt of the electromagnetic wave for the power reception; and
   a second filter that passes a frequency band of the transmission signal for the RFID.

5. The RFID inlay according to claim 4, wherein the antenna sharing circuit is disposed between the antenna and the power receiving terminal.

6. The RFID inlay according to claim 5, wherein the power receiving terminal includes a first power receiving terminal and a second power receiving terminal.

7. The RFID inlay according to claim 6, wherein the first filter includes:
   a first low frequency band-pass filter between the antenna and the first power receiving terminal and that is configured to pass a first low frequency band of the received power induced in the antenna upon receipt of the electromagnetic wave for the power reception; and
   a second low frequency band-pass filter between the antenna and the second power receiving terminal and that is configured to pass a second low frequency band of the received power induced in the antenna upon receipt of the electromagnetic wave for the power reception.

8. The RFID inlay according to claim 4, wherein an LC parallel resonance circuit is formed by the first filter and a capacitance component between the power receiving terminal and a ground when a potential of the transmitting terminal is brought towards a ground potential.

9. The RFID inlay according to claim 8, wherein the transmission signal output from the transmitting terminal is prevented from flowing into the power receiving terminal when the LC parallel resonance circuit is formed.

10. The RFID inlay according to claim 1, further comprising a filter disposed between the antenna and the power receiving terminal and configured to pass a low frequency band of the received power induced in the antenna upon receipt of the electromagnetic wave for the power reception.

11. The RFID inlay according to claim 1, further comprising a broadband matching circuit disposed between the transmitting terminal and the antenna sharing circuit and configured to suppress a change in characteristics of the antenna and the antenna sharing circuit caused by a change in impedance of the transmitting terminal when the RFIC performs transmission.

12. The RFID inlay according to claim 1, further comprising a capacitor that is connected in parallel to an internal capacitance of the RFIC.

13. The RFID inlay according to claim 1, wherein the antenna comprises a dipole antenna formed of a meander line-shaped conductor pattern disposed on an insulation sheet.

14. The RFID inlay according to claim 1, wherein the power receiving terminal outputs no transmission signal, and the transmitting terminal receives no power induced upon receipt of an electromagnetic wave.

15. The RFID inlay according to claim 1, wherein the RFIC is configured to generate the transmission signal for the RFID based on the power received by the power receiving terminal.

16. An RFID inlay comprising:
   an antenna constructed to receive an electromagnetic wave and to generate an output signal for RFID;
   an RFIC that includes a power receiving terminal that receives power induced upon receipt of the electromagnetic wave and a transmitting terminal that outputs a transmission signal for the RFID; and
   at least one antenna sharing circuit that includes:
      at least one inductor and at least one capacitor and that couples the antenna to the RFIC and is constructed to configure the antenna as both a power receiving antenna and a signal transmitting antenna, and
      a switch configured to connect the transmitting terminal to the antenna when the transmission signal for the RFID is transmitted,
      wherein the switch is disposed between the antenna and the transmitting terminal, and no switch is disposed between the antenna and the power receiving terminal.

17. The RFID inlay according to claim 16, wherein the at least one antenna sharing circuit is a directional coupler including the at least one inductor and the at least one capacitor, with the directional coupler being configured to output the received power induced in the antenna upon receipt of the electromagnetic wave to the power receiving terminal, and the at least one antenna sharing circuit is further configured to output the transmission signal from the transmitting terminal to the antenna to generate the output signal for the RFID.

18. The RFID inlay according to claim 16, wherein the at least one antenna sharing circuit includes:
   a first filter that passes a low frequency band of the received power induced in the antenna upon receipt of the electromagnetic wave; and
   a second filter that passes a frequency band of the transmission signal for the RFID.

19. The RFID inlay according to claim 18,
   wherein the power receiving terminal includes a first power receiving terminal and a second power receiving terminal, and
   wherein the first filter includes:
      a first low frequency band-pass filter between the antenna and the first power receiving terminal and that is configured to pass a first low frequency band of the received power induced in the antenna upon receipt of the electromagnetic wave; and
      a second low frequency band-pass filter between the antenna and the second power receiving terminal and that is configured to pass a second low frequency band of the received power induced in the antenna upon receipt of the electromagnetic wave.

20. The RFID inlay according to claim 16, further comprising a broadband matching circuit disposed between the transmitting terminal and the at least one antenna sharing circuit and configured to suppress a change in characteristics of the antenna and the at least one antenna sharing circuit caused by a change in impedance of the transmitting terminal when the RFIC performs transmission.

21. An RFID inlay comprising:
   an RFIC that includes a power receiving terminal that receives power induced upon receipt of an electromagnetic wave for power reception and a transmitting terminal that outputs a transmission signal for RFID;
   an antenna configured to receive the electromagnetic wave for the power reception and to generate an electromagnetic wave for the RFID; and
   an antenna sharing circuit disposed between the antenna, the power receiving terminal and the transmitting terminal,
   wherein the antenna sharing circuit includes a switch configured to connect the transmitting terminal to the antenna when the transmission signal for the RFID is transmitted, and
   wherein the switch is disposed between the antenna and the transmitting terminal, and no switch is disposed between the antenna and the power receiving terminal.

22. An RFID inlay comprising:
   an RFIC that includes a power receiving terminal that receives power induced upon receipt of an electromagnetic wave for power reception and a transmitting terminal that outputs a transmission signal for RFID;
   an antenna configured to receive the electromagnetic wave for the power reception and to generate an electromagnetic wave for the RFID; and
   an antenna sharing circuit that includes at least one inductor and at least one capacitor and that is disposed between the antenna, the power receiving terminal and the transmitting terminal,
   wherein:
      the power receiving terminal includes a first power receiving terminal and a second power receiving terminal,
      the transmitting terminal includes a first transmitting terminal and a second transmitting terminal, and
      the antenna sharing circuit comprises:
         a first antenna sharing circuit coupled to the first power receiving terminal and the first transmitting terminal, and
         a second antenna sharing circuit coupled to the second power receiving terminal and the second transmitting terminal.

* * * * *